Patented Oct. 13, 1953

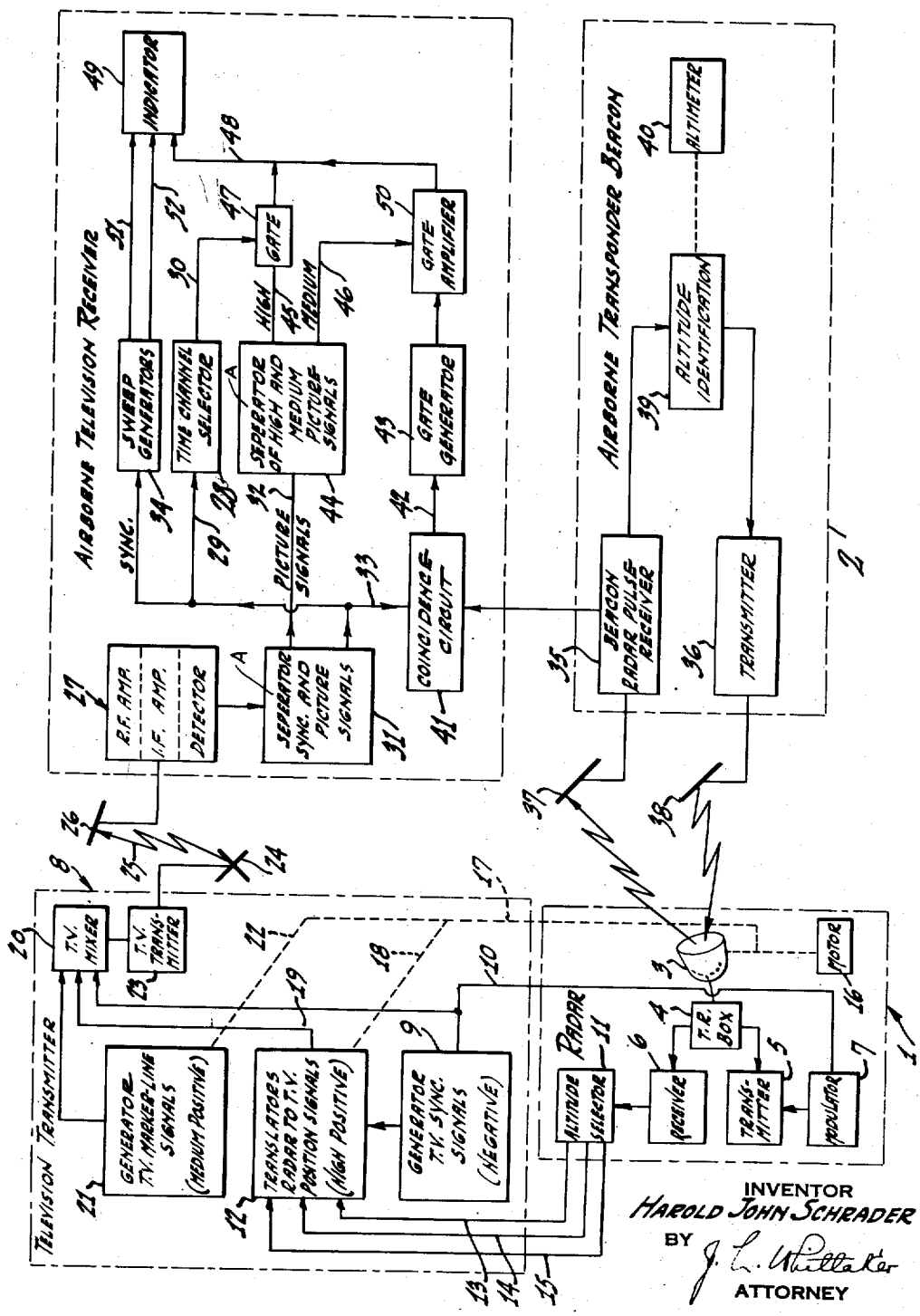

2,655,648

UNITED STATES PATENT OFFICE 2,655,648

RADIO NAVIGATION SYSTEM

Harold John Schrader, Haddonfield, N. J., assignor to Radio Corporation of America, a corporation of Delaware Application December 31, 1948, Serial No. 68,644

8 Claims. (Cl. 343—6.0)

This invention relates to improvements in radio navigation systems wherein ships or aircraft receive information transmitted over a television link from a ground radar.

Three such systems are described in co-pending U. S. patent applications Serial No. 613,509, filed August 30, 1945, by Irving Wolff, now Patent No. 2,528,202, issued October 31, 1950; Serial No. 607,999½, filed July 31, 1945, by Loren F. Jones, now Patent No. 2,632,157; and Serial No. 725,206, filed by Philip J. Herbst on January 30, 1947, now Patent 2,490,268, issued December 6, 1949.

In general the improvements of the present invention prevent false self-identification, improve the picture quality of a "self-identification" line which forms part of the plan-position display produced at each television receiver, and prevent the display of unwanted traffic information. More particularly these ends are accomplished in part by adding to a self-identification circuit, which in the prior art responds to any radar interrogation to intensify the plan-position display in order to show the self-identification line, a coincidence circuit which limits its responsiveness to interrogations by the radar at the particular ground station which is in television contact with the craft. The coincidence circuit is actuated by the interrogating radar pulses and certain ones of the television synchronization pulses which are made to be synchronous therewith; and in part by separating in the television receiver signals which represent traffic information from signals which represent the self-identification line. The latter expedient prevents multiplexing of the traffic-information signals from lowering the frame rate of the self-identification line signals and prevents the operation of the self-identification circuit from interfering with the visual presentation of traffic-information signals.

In accordance with the systems of the kinds described in the above-mentioned applications a ground radar set, assisted by beacon transponders carried in aircraft, produces information pertaining to air traffic conditions in its operating areas. The transponder beacon in any craft is adapted to characterize its responsive signals in accordance with which one of a number of predetermined altitude layers is occupied by the craft, for example, the carrier frequency of the responses may be variable stepwise under control of the altimeter, or as in the system described in the application Serial No. 725,206, now Herbst Patent 2,490,268, the responses may consist of pairs of pulses and be characterized according to altitude by controlling the spacing between them. Whatever type of characterization is used by the beacon, appropriate equipment is provided in the ground radar for separating the different beacon responses according to the altitude layers from which they come so that the air traffic information is usefully subdivided. Radar signals representing the subdivisions of information may be fed to individual indicators to produce a plurality of plan position displays suitable for televising or, instead, they may be more directly translated into television type of electrical signals by the use of storage cathode ray tubes having semi-conducting targets.

At the ground station the subdivisions of air traffic information, having been appropriately translated into television type signals, are broadcast to the aircraft, each of which has a television receiver for translating the signals into a plan-position display for any desired altitude stratum. In some systems the television transmitter employs a plurality of carrier frequency channels, each one being allotted for broadcasting a different subdivision of the traffic information. However, inasmuch as this requires a very large overall frequency band, an improved system was developed which uses time channel multiplexing (see the co-pending Herbst application Serial No. 725,206 mentioned above).

As shown in the Wolff application Serial No. 613,509 and the Jones application Serial No. 607,999½, the system may also comprise means in each craft for identifying which pip represents that craft in the plan position display for its altitude layer. A preferred form of this means comprises a circuit in the beacon receiver in each aircraft for integrating radar pulse energy which it receives during each interrogation to produce a gate pulse, and a connection to the associated television receiver for increasing its sensitivity with this pulse. This causes a "self-identification" line, which marks a particular pip, to appear on the plan position display—because of the following: The composite television signal for each altitude level is caused to include components representing a line which rotates in synchronism with the radar antenna, for example, the signal may include components derived from televising, as part of a plan-position display at the ground radar, the time-base strobe line which is made to appear therein by setting the gain of the ground radar receiver sufficiently high to cause the fluorescent screen of the radar indicator (which is producing that display) to be excited by random noise transients. Or, as illustrated, in the Jones application Serial No. 607,999½, the components representing the self-identification line may be produced in other ways. But, however they are produced, they are broadcast at a lower signal level than the components representing the positions of aircraft, i. e., than the "pips." Each airborne television receiver is adjusted so that the self-identification line only becomes visible in its P. P. I. display during momentary brightening thereof which is occasioned once for every interrogation when the sensitivity of the receiver is transiently increased.

Prior art navigation systems which make use of a self-identification line have had a disadvantage which arises from the fact that different ground radars will normally employ the same radar carrier frequency—even though they may employ different television carrier frequencies. As a result, interrogations by other radars than the one in television contact with an aircraft may brighten the P. P. I. display of information produced in the craft and will thereby cause the self-identification line to come into view at uncontrolled times not related to the interrogations by that one radar.

In addition, prior art navigation systems in which both the above-mentioned self-identification and time channel multiplexing are used have a disadvantage in that the quality of the self-identification line which appears on the plan position display is unsatisfactory. Assuming the use of as few as five altitude strata and of as many television frames per second as 45 the number of frames usefully displayed in any craft will only be nine per second. By using a persistent phosphor in the television picture tube flicker of pips presented in the display can almost entirely be eliminated. However, it is not this easy to produce a steady display of the self-identification line. If the radar beam is one degree wide and the azimuthal scanning rate 12 per minute, there will be only one interrogation every five seconds and it will last only about 14 milliseconds. Each of these very occasional and brief interrogations which does not happen to occur during the one particular frame out of five which is the only one usefully displayed, will contribute nothing toward brightening the television picture. I have found that because of this the marker line appears but occasionally and in a non-periodic manner.

There is a further disadvantage for particular prior art embodiments of navigation systems in which both the above-mentioned self-identification and time channel multiplexing are employed. In these particular embodiments, the unwanted information reaching an aircraft in other time channels than that selected to be displayed is rejected by a gating circuit which lowers the receiver sensitivity during those time channels. Since the self-identification circuit causes the receiver sensitivity to be increased, I have found that an interrogation which happens to occur during an unwanted time channel may oppose the receiver gating to bring in high level television signal components, i. e., those representing traffic information. Thus, unwanted pips may appear in the plan position display and this may occur irrespective of whether the interrogation is by the radar at the ground station which is broadcasting the television signals or by some other nearby radar.

It is an object of the present invention to devise an improved system of the kind set forth in which incorrect self-identification will not be produced as a result of interrogations of some other radar.

It is a further object of the present invention to devise an improved system of the kind set forth in which the picture quality of the self-identification line will be improved.

It is a further object of the present invention to devise an improved system of the kind set forth in which the self-identification circuit will not operate to actuate a plan-position indicator with signals broadcast in an undesired time channel and representing information which is intended to be suppressed.

Other objects, advantages and features of this invention will be apparent to those skilled in the art from the following detailed description of an illustrative embodiment of the present invention and from the drawing in which the single figure represents an improved radio navigation system according to the present invention.

In the drawing there are shown a ground radar 1 cooperating with an airborne transponder beacon 2 to obtain data representing the position of the craft (not shown) carrying the beacon. It is to be understood that in the operation of the system herein, there usually will be a plurality of aircraft in the operational area served by the radar and that therefore there will be a plurality of airborne transponder beacons co-operating with the ground radar set each one doing so in the manner shown in the single example herein.

As is fully described in the co-pending applications cited herein, the ground radar set 1 comprises a directive antenna 3 which is used both for transmitting outgoing radar pulses and for receiving incoming echoes thereof and/or responses from beacons. To this end, a T-R box 4 is used in a known manner for connecting the antenna 3 to both a radar transmitter 5 and radar receiver 6. A modulator 7, comprising means for periodically producing extremely short pulses, is connected to key the transmitter 5 so that the transmissions from the antenna 3 on the form of periodically repeated short bursts of electromagnetic energy.

According to the present invention each of the radar pulses is transmitted in synchronism with one of the high frequency synchronization pulses of the composite television signal broadcast from the television transmitter 8 associated with the radar 1. To this end a generator of television synchronization signals 9 is coupled to the modulator 7 over a synchronization circuit 10 shown herein as a single line. This representation is only diagrammatic and the circuit itself would not be so simple, for example, even the simplest electrical connection between the generator 9 and the modulator 7 would include two conductors. Moreover, the circuit 10 might even comprise an additional pulse generator feeding both the modulator 7 and generator 9 so as to bring them into synchronization with its own pulse output. However, since there are many known ways of synchronizing periodic outputs of two pulse generators, it is unnecessary herein to describe this arrangement in any greater detail. The radar receiver 6 feeds in parallel a group of selectors 11 equal in number to the number of altitude strata employed in the navigation system. In the drawing block 11 represents three selectors this number being chosen arbitrarily for illustrative purposes. The group of altitude selector 11 may be of the kind shown as blocks 11, 13, 15, 17, 19 and 21 and fully described in the above-mentioned co-pending Herbst application Serial No. 725,206. Television transmitter 8 comprises a group of signal translators 12, each adapted to translate signals reaching it from one of the altitude selectors, from their form as radar signals to the form of television signals representing the same subdivision of the traffic information. There are as many translators as altitude selectors. In the drawing, the three lines 13, 14 and 15 represent circuits interconnecting the respectively cooperating altitude selectors and translators.

Each of the translators may consist of a radar indicator tube for producing a plan-position display of the subdivision of traffic information selected for it by the action of its associated altitude selector and a cooperating television pick-up device, such as a storage orthicon, for converting the display into television type signals. If a storage orthicon is employed, the indicator may have the short-persistence screen and an effect corresponding to persistence will be simulated by the storage pick-up tube.

However, it is not essential that the radar signal reaching a translator be converted into a visible display. Instead, each translator, i. e., each combination of a picture tube and a pick-up device, may be replaced by a single cathode ray tube of a kind in which a storage type target (which ordinarily is not fluorescent) has the subdivision of traffic information written onto it, as a charge pattern, by a beam scanned in accordance with the pulsing of the radar and the rotation of its antenna 3, and has the charge pattern "read" by a beam scanned in accordance with the television raster to translate it into a television type of a signal. Obviously, either form of translator requires a means for scanning of a writing cathode ray beam in accordance with the pulsing of the radar and the rotation of the radar antenna. Accordingly, in the arrangement shown herein a motor 16, which serves to drive the antenna 3 for azimuthal scanning, is connected to the group of translators over a mechanical link 17 and a branch link 18. The element of each translator controlled over the mechanical linkage may consist of a rotatable magnet (not shown) of the kind which is well-known and widely used for producing plan position displays. The group of translators 12 may be provided with a common sweep generator or a group of sweep generators feeding the rotatable magnets to produce periodic currents having sawtooth wave forms. It is to be understood that any such generator will be synchronized with the radar over a synchronization line not shown.

Included along with the translators in the circuits represented by block 12 of the drawing is a commutator circuit by which the respective translators are sequentially connected to a single output conductor 19 in a predetermined order so that their outputs are assigned to different time channels. In the Herbst patent application Serial No. 725,206, such a commutator device is shown as a multivibrator ring oscillator having a plurality of stages which operate successfully to turn on different ones of the pick-up tubes comprised in the group of translators used therein so that at any one time only one of them is delivering its output signals to a common output circuit. Frame synchronizing pulses are applied to the commutator device from the generator 9 causing it to move one step at a time. Associated with one stage of the commutator device is a pulse generator (not shown) providing a timing mark at the conclusion of each sequence, i. e., a time reference for the periodically repeated time channels.

The cooperation of the group of altitude selectors 11 and the group of translators 12 herein is generally as follows: The group of altitude selectors 11 will receive in parallel from the radar receiver 6 intermingled pulse responses arriving from beacons at various altitudes, each of the pulse responses being characterized according to one of the predetermined altitude strata; each of the altitude selectors will accept only the responses characterized according to a particular altitude layer and will route those signals over a different one of the circuits 12, 14 or 15 to one of the translators associated with it; each translator will translate the radar signals which it receives into corresponding television signals, and by the action of the commutator circuit associated with the group of translators, it will deliver them onto the common output conductor 19 in a predetermined time channel assigned to it. The thus multiplexed signals pass from the group of translators over output conductor 19 to a mixer 20. These signals will be referred to as television-type signals representing subdivision of traffic information. The mixer 20 also receives the high and low frequency television synchronization pulses produced in the generator 9 and acts to mix them, in any suitable manner with the signals representing traffic information, for example, the pulses representing traffic information may be positive-going pulses whereas the synchronization pulses may be negative-going. Along with the traffic information signals from the group of translators the mixer 20 receives the timing mark produced by the pulse generator associated with the commutator device.

Block 21 represents a generator of television signals representing the "self-identification" or "marker" line. It may be a generator of the kind shown in the Jones patent application Serial No. 607,999½. Whether it is of that type, or is of a type employing a cathode ray picture tube scanned in accordance with the pulsing of the radar and the rotation of its directional antenna to produce a radial strobe line angularly rotating about one of its ends, it is necessary that an element of the generator (block 21) be controlled in accordance with the radar antenna rotation. Accordingly, the mechanical link 17 is shown also to be connected to the generator 21 the connection shown involving a second branch link 22. The output of block 21, which will be in the form of video pulses will also be fed to the mixer 20. These pulses are adjusted to be of substantially smaller amplitude than the pulses representing the traffic information which are delivered over output conductor 19.

Mixer 20 is connected to a television transmitter 23 so as to modulate its carrier wave output with the composite video signal produced in the mixer. The high frequency television signals are broadcast over an antenna 24 and, as represented in the drawing by an arrow 25, they are intercepted by an antenna 26 of the airborne television receiver carried in the same craft as is carrying the beacon 2. As previously was mentioned in referring to the beacon 2, under normal conditions there usually will be a plurality of aircraft in the operational area served by the aircraft. Accordingly there will be a plurality of television receivers like the one shown in the single example herein. For this and other reasons, the antenna 24 preferably has an omnidirectional pattern. The signals received on antenna 26 passes through certain conventional circuits of the receiver such as R-F and I-F amplifiers for selecting and amplifying signals in the frequency band of the television transmissions and a detector for separating out the video components. These portions of the receiver are represented together in a block 27.

A time channel selector 28 which may correspond in circuit and function to the circuit represented by block 101 shown in the Herbst application Serial No. 725,206 has its output connected to some convenient point in a traffic information channel in the receiver to render it operative only during a desired time channel. The time channel selector may comprise another multivibrator ring oscillator; a knob (not shown) for selecting which stage of the commutator will gate the receiver with its output wave, an input 29 for receiving both frame synchronizing pulses to move the commutator device one step at a time and timing marks to synchronize the groups of receiver time channels with those of the transmitter; and an output 30 over which the time channel selector usefully applies to an element of the receiver the gate which it produces.

The composite video signal is delivered from the detector of block 27 to a synchronization separator 31 which acts in a known manner to route the positive-going signals (which include both the high-level picture signals and the medium-level identification line signals) to an output conductor 32 and the negative-going synchronization pulses to an output conductor 33. The synchronization pulses besides being fed to the time channel selector 28 are fed to the high and low frequency sweep generators 34 to control them in the usual manner. They are also fed to a coincidence circuit 41 where certain ones of the synchronization pulses will cooperate with radar pulses received by the beacon receiver during interrogations to the end that the self-identification line will be made to appear only during interrogations by the particular radar at which is in television contact with the craft.

With reference now to the block diagram of the airborne beacon 2, it comprises a receiver 35 and a transmitter 36 which is coupled to the receiver and is triggered thereby to produce a response each time that a radar pulse passes through the receiver. A receiving antenna 37 intercepts interrogating pulses from the ground radar 1 and feeds them to the receiver 35. A retransmitting antenna 38 receives the responses from transmitter 36 and radiates them back to the ground radar. An altitude identification device 39 under control of an altimeter 40 causes the responses produced by transmitter 36 to be characterized in accordance with altitude stratum in which the craft is flying when its beacon receiver receives the radar interrogation pulses. One type of altitude identification device is that shown in the Herbst patent application Serial No. 725,206. A device of that type of device upon receiving a pulse from the output of the beacon receiver first transfers it directly to the beacon transmitter and with negligible delay and very soon thereafter transfers it thereto again with a controlled amount of delay, i. e., over a delay line the length of which is controlled by the altimeter—whereby each response consists of two pulses separated according to altitude.

The radar interrogation pulses produced at the output of beacon receiver 35 are also sent to the airborne television receiver and in particular to coincidence circuit 41 thereof to which are applied the synchronization pulses available at the output of separator 41. If the radar pulses come from the same ground station which is in television communication with the craft carrying the beacon, each of them will be in synchronism with one of the high frequency television synchronization pulses reaching the television receiver carried in that craft. These synchronous pulses will actuate coincidence pulse circuit 41. For each interrogation there will be received a short train of radar pulses, say 14, and each of these pulses aided by a television synchronization pulse will produce an output pulse from coincidence circuit 41. These output pulses are fed over a conductor 42 to a gate generator 43 which may be of the kind shown as block 62 and described in the co-pending Wolff application Serial No. 613,509. As explained therein, the gate generator either may act only to integrate the pulses doing so to produce a gate pulse starting at the first pulse of the train and ending at the last one, or it may act in addition to producing this integrated pulse to apply it to actuate a multivibrator which will produce an even longer gate having a duration equivalent to one whole television frame, i. e., of a duration of the order of 1/45 of a second rather than of 14 milliseconds. This gate is used to cause the self-identification line to appear on the indicator of the airborne television receiver.

One of the objects of this invention is attained by the use of the coincidence circuit 41 since it will prevent gate pulses from being produced in response to interrogations by radars not in television communication with the craft and will thus avert the production of spurious self-identification lines. Another object is attained because of the fact that the selection, from the multiplexed signals, of only those which are in one predetermined time channel does not apply to the components of the composite television signal which represent the self-identification line. Because of this every television frame of the self-identification line signals produced in the generator 21 will be available to be applied to the indicator at whatever time there is an interrogation by the radar 1, thus assuring optimum picture value for the self-identification line. Separator 31 delivers all of the positive-going pulses of the composite television signal to a circuit 44 for separating the high level signals representing traffic information from low level signals representing the self-identification line, these respective signals being produced on individual output conductors 45 and 46. Circuit 44 may be of the kind described in co-pending U. S. application Serial No. 777,193 filed October 1, 1947, in the name of Everett Eberhard, now Patent 2,496,909. In series with the output 45 there is a gating device 47 which is actuated by the gate pulses from the time channel selector 28 over its output conductor 30. As a result, it is only the high-level signals, i. e., traffic information signals, which are utilized only in one desired time channel out of a plurality. The selected traffic information signals are applied over a coupling 48 to the television indicator 49 where they may be fed to the control grid of a cathode ray picture tube. The time channel selector 28 does not act upon the other individual output conductor 46 and therefore every frame of the medium-level signals (those representing the self-identification line) will reach a gated amplifier 50 which is actuated by the gate pulses produced in the gate generator 43.

Each time that the radar 1 interrogates the beacon 2, gated amplifier 50 will transfer medium level pulses to the coupling circuit 48 over which they will reach the indicator 49. This will cause the appearance of the self-identification line on the plan-position display produced by the indicator 49. Since this line will occur in the display at an angle which corresponds to the azimuthal bearing of the antenna 3 at the time of the interrogation, it will pass through the one pip on that display which represents the craft carrying the beacon 2.

For the purpose of producing a television type of raster on the fluorescent screen of the picture tube of the indicator 49 the sweep generators 34 are connected to appropriate beam deflection elements of the indicator 49 over circuits 51 and 52.

The third object of this invention is attained due to the fact that the gating circuit for causing the self-identification line to be displayed does not act upon the channel of the television receiver which is carrying high-level signals representing the various subdivisions of traffic information and that therefore it cannot cause high level signals in a wrong time channel to be applied to the indicator 49 to display information which is intended to be suppressed.

I claim as my invention:

1. A receiving system comprising a television receiver for receiving composite television signals including first pulses representing traffic information, second pulses representing a self-identification line, and third pulses for synchronizing the sweep generators of the receiver, first, second, and third separate video frequency signal circuits in said receiver, means in the receiver for separating the three kinds of pulses to apply them respectively to the separate signal circuits, an indicator responsive to the first pulses to produce a display of traffic information including visible spots representing the positions of craft and responsive to the second pulses to produce an identification display identifying one of the spots as representing a particular craft, said first and second signal circuits being both connected to said indicator for applying thereto said first and second signals, a normally closed gate in said second signal circuit, a pulse receiver associated with the television receiver, a gating pulse generator connected to the output of the pulse receiver and responsive to a train of short-duration pulses to produce a long gating pulse, and means for applying the gating pulse to the gate to open it for the transmission of said second pulses to said indicator.

2. A receiving system as in claim 1 also comprising in the connection between said pulse receiver and said gating pulse generator a coincidence circuit for selectively responding to pulses from the former to provide pulses to the latter, said third signal circuit being connected to the coincidence circuit for applying thereto said third pulses to cause the coincidence circuit to respond to any pulses from the pulse receiver which are respectively in a synchronism with ones of said third pulses whereby the gating pulse generator will produce a gating pulse only when said third pulses in a composite signal received by the television receiver are in synchronism with pulses simultaneously received by the pulse receiver.

3. A receiving system as in claim 1 also comprising a commutator device adjustable to produce a gate pulse extending over any selected one of a group of sequentially occurring predetermined time channels, said first signal circuit including a normally-open gate, and means for controlling the gate with said gate pulse to transfer said first pulses to the indicator during any one of said time channels.

4. A receiving system as in claim 1 also comprising in the connection between said pulse receiver and said gating pulse generator a coincidence circuit for selectively responding to pulses from the former to provide pulses to the latter, said third signal circuit being connected to the coincidence circuit for applying thereto said third pulses to cause the coincidence circuit to respond to any pulses from the pulse receiver which are respectively in a synchronism with ones of said third pulses, a commutator device adjustable to produce a gate pulse extending over any selected one of a group of sequentially occurring predetermined time channels, said first signal circuit including a normally-open gate, and means for controlling the gate with said gate pulse to transfer said first pulses to the indicator during any one of said time channels.

5. In a radio navigation system comprising a ground station including a radar which has a pulse modulated transmitter and an angularly scannable directive antenna and is operable for obtaining and displaying signal information as to the positions of mobile craft in an operating area and a television transmitter responsive to said radar display for broadcasting the signal information to mobile craft in the area, and at least one mobile receiving station which is carried in a craft and includes a radar pulse receiver, a television receiver and a television indicator responsive to output from the television receiver to produce a display of traffic information including visible spots representing the positions of craft, in which the system further comprises means at the ground station for causing each of the transmitted radar pulses to occur in synchronism with one of the television synchronization pulses broadcast from the television transmitter, a coincidence circuit carried in the mobile craft and associated with both the radar pulse receiver and the television receiver, means in the mobile craft for applying received radar pulses and television synchronization pulses to the coincidence circuit, the coincidence circuit being responsive to a radar pulse when it is applied thereto in synchronism with one of the television synchronization pulses to produce an output voltage, a gate in the television receiver responsive to said output voltage so to increase what part of the output of the receiver is applied to said indicator as to produce an identification display, and means for applying said output voltage to the gate for causing it to respond whenever said radar pulse receiver and said television receiver both simultaneously are receiving transmissions from said ground station.

6. In a radio navigation system as in claim 5 in which the composite signals broadcast by said television transmitter include first pulses representing traffic information, second pulses representing said identification display and third pulses for synchronizing the sweep generators of said television receiver, first, second and third separate video frequency signal circuits in said television receiver, means in said television receiver for separating the three kinds of pulses to apply them respectively to the separate signal circuits, said indicator being responsive to the first pulses to produce said display of traffic information and responsive to said second pulses to produce said identification display, and said gate is connected in series in said second signal circuit.

7. In a radio navigation system as in claim 6 which also comprises in the mobile receiving station a commutator device adjustable to produce a gate pulse extending over any selected one of a group of sequentially occurring predetermined time channels, said first signal circuit including a normally-open gate and means for controlling the normally-open gate with said gate pulse selectively to transfer said first pulses to the indicator during any one of said time channels.

8. Apparatus to be carried by a mobile craft comprising in combination a television receiver for receiving identification display producing signals and accompanying synchronizing signals, said receiver including an indicator display device, said receiver also including means for separating said identification display producing signals and said synchronizing signals from each other, a transponder beacon that includes a beacon receiver for receiving radar pulses transmitted from a radar ground station in synchronism with said synchronism pulses, said television receiver including a normally blocked channel for supplying said identification display producing signals to said indicator display device, and means including a coincidence circuit for unblocking said channel in response to the application to said coincidence circuit of both radar pulses from said beacon receiver and television synchronizing pulses from said television receiver.

HAROLD JOHN SCHRADER.

References Cited in the file of this patent

UNITED STATES PATENTS

| Number | Name | Date |
|---|---|---|
| 2,459,481 | Wolff | Jan. 18, 1949 |
| 2,459,482 | Bond | Jan. 18, 1949 |
| 2,468,045 | Deloraine | Apr. 26, 1949 |
| 2,480,068 | Wolff | Aug. 23, 1949 |
| 2,480,123 | Deloraine | Aug. 30, 1949 |
| 2,502,317 | Ewing | Mar. 28, 1950 |
| 2,510,987 | Levy | June 13, 1950 |
| 2,513,282 | Busignies | July 4, 1950 |
| 2,528,202 | Wolff | Oct. 31, 1950 |
| 2,530,957 | Gilman | Nov. 21, 1950 |
| 2,533,552 | Brinster et al. | Dec. 12, 1950 |